United States Patent
Franz et al.

(10) Patent No.: US 6,739,193 B2
(45) Date of Patent: May 25, 2004

(54) MICROMECHANICAL STRUCTURE, IN PARTICULAR FOR AN ACCELERATION SENSOR OR YAW RATE SENSOR AND A CORRESPONDING METHOD FOR PRODUCING THE SAME

(75) Inventors: Jochen Franz, Reutlingen (DE); Matthias Illing, Wannweil (DE); Frank Henning, Reutlingen (DE); Frank Fischer, Reutlingen (DE); Peter Hein, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/169,511

(22) PCT Filed: Dec. 9, 2000

(86) PCT No.: PCT/DE00/04379
§ 371 (c)(1),
(2), (4) Date: Oct. 28, 2002

(87) PCT Pub. No.: WO01/50137
PCT Pub. Date: Jul. 12, 2001

(65) Prior Publication Data
US 2003/0115960 A1 Jun. 26, 2003

(30) Foreign Application Priority Data
Jan. 7, 2000 (DE) .......................... 100 00 368

(51) Int. Cl.⁷ .................... G01P 15/08; G01P 19/00
(52) U.S. Cl. ................ 73/514.29; 73/514.32; 73/504.12
(58) Field of Search .................. 73/514.16, 514.29, 73/514.32, 514.38, 514.21, 514.24, 514.35, 514.36, 504.02, 504.04, 504.12, 504.13, 504.14, 504.15, 510, 511; 361/280; 257/415, 416, 417, 418, 419, 420

(56) References Cited

U.S. PATENT DOCUMENTS

| 5,572,057 A | * 11/1996 | Yamamoto et al. ......... 257/417 |
| 5,760,455 A | 6/1998 | Hierold et al. ........... 73/514.32 |
| 6,249,073 B1 | * 6/2001 | Nguyen et al. ............. 310/309 |
| 6,318,175 B1 | * 11/2001 | Muchow et al. ......... 73/514.29 |

FOREIGN PATENT DOCUMENTS

| DE | 197 00 290 | 7/1998 |
| DE | 197 19 601 | 11/1998 |
| EP | 0 766 090 | 4/1997 |

* cited by examiner

Primary Examiner—Helen Kwok
(74) Attorney, Agent, or Firm—Kenyon & Kenyon

(57) ABSTRACT

A micromechanical structure and a corresponding manufacturing method. The structure includes a substrate, which includes an anchoring device, and a centrifugal mass, which is connected to the anchoring device via a flexible spring device, so that the centrifugal mass is elastically deflectable from its rest position. The centrifugal mass includes clearances and is configured to be deflectable by etching a sacrificial layer underneath it. The sacrificial layer is present in a first area located underneath the centrifugal mass with a first etchable thickness, and in a second area located underneath the centrifugal mass with a second etchable thickness, the second thickness is greater than the first thickness. The centrifugal mass is structured in the first area so that in etching only a maximum of two etching fronts may come together in order to limit the etching residue deposits.

6 Claims, 8 Drawing Sheets

FIG 2
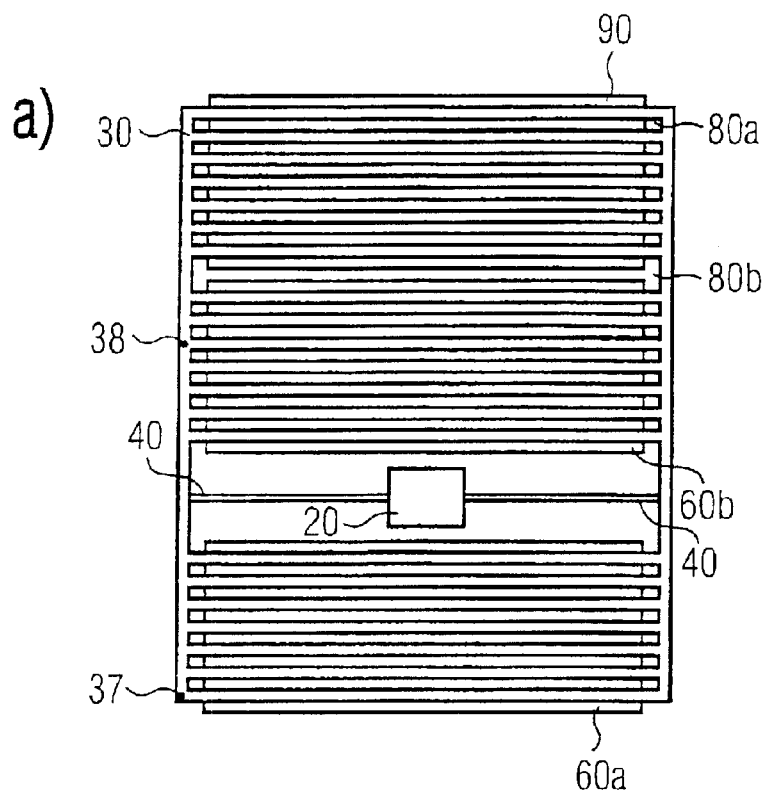
a)
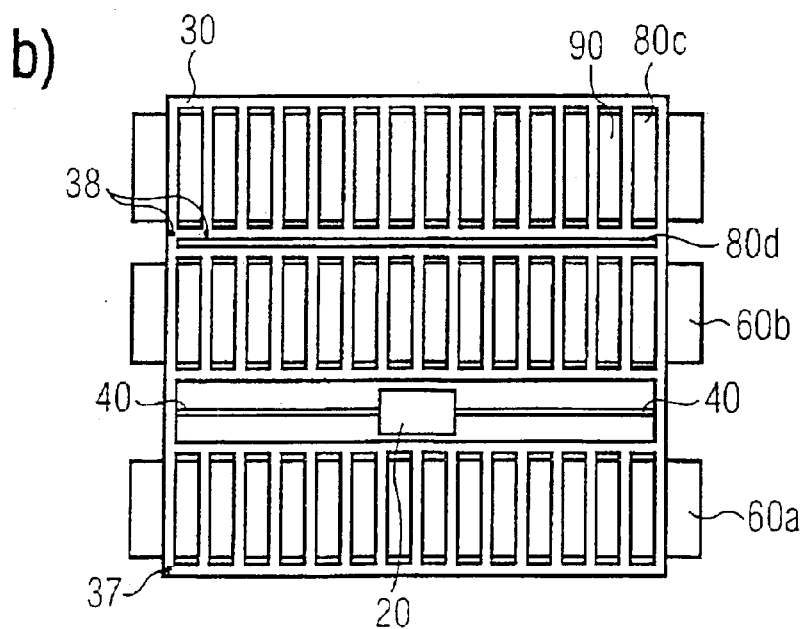
b)

FIG 4
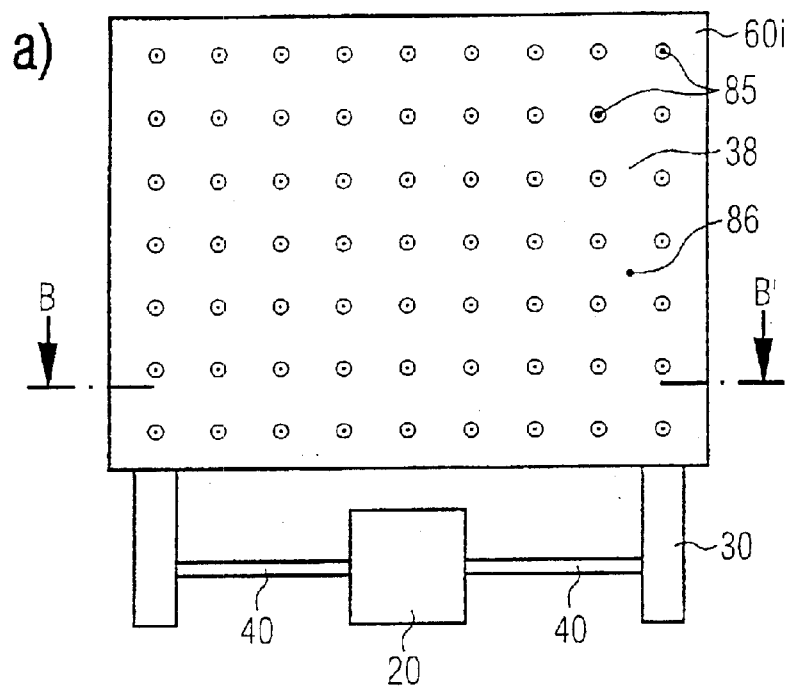
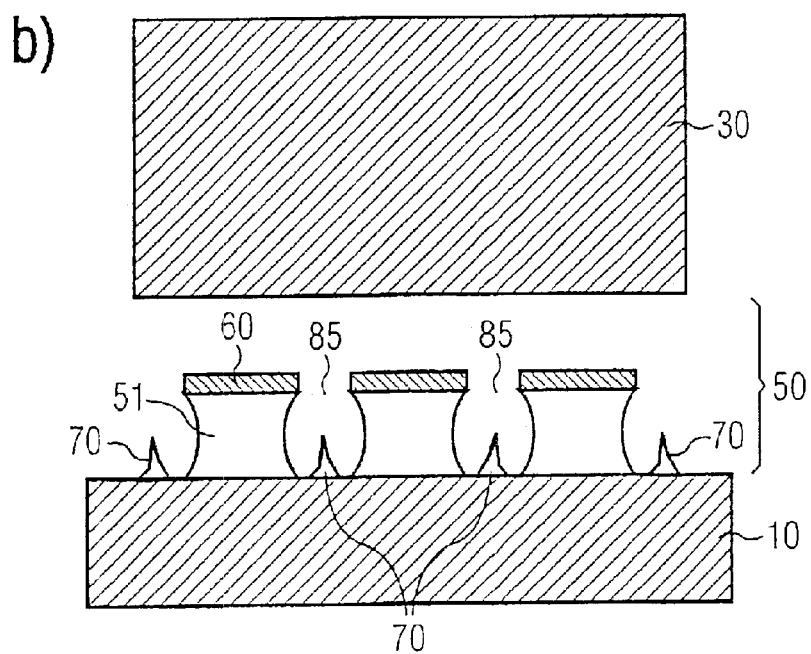

FIG 6
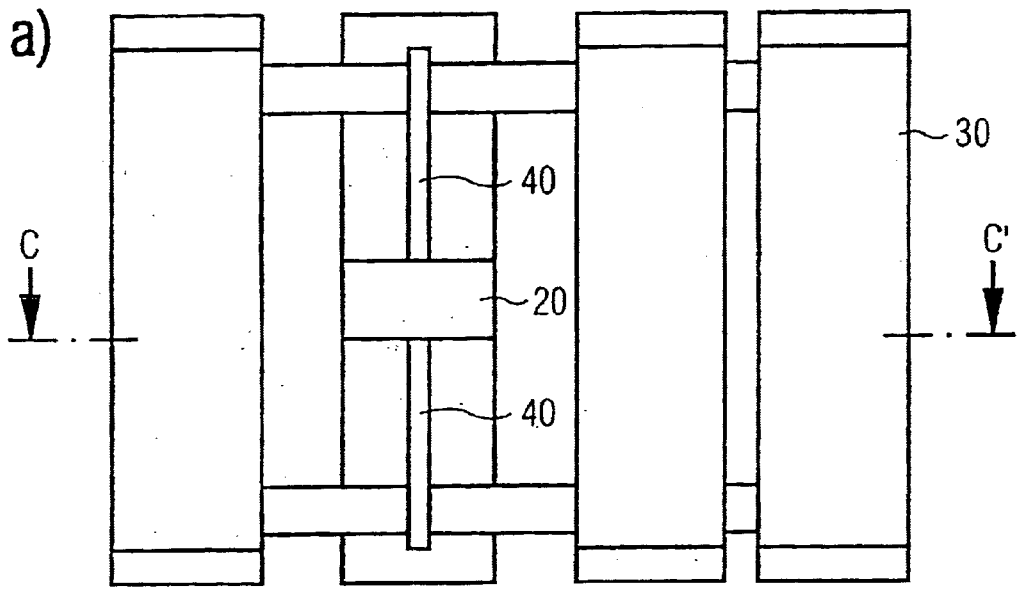
a)
PRIOR ART
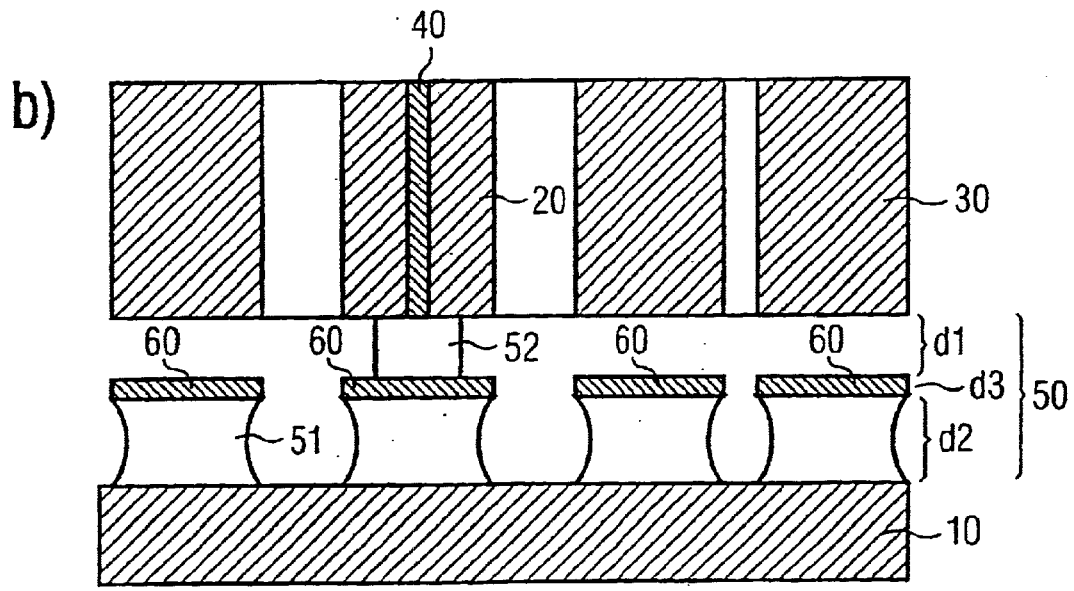
b)
PRIOR ART

FIG 7
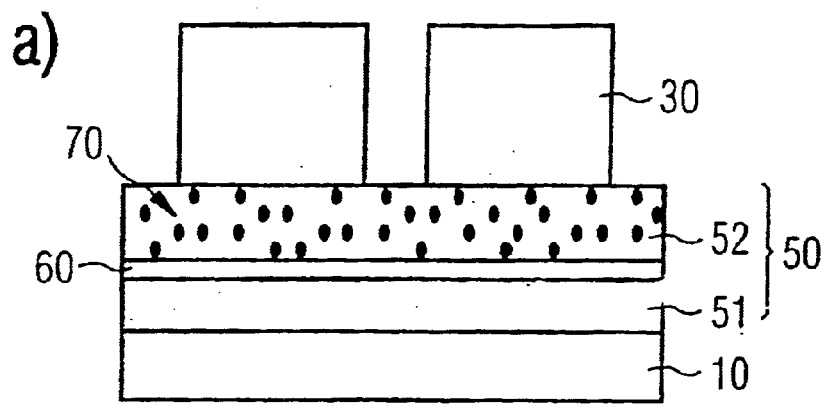
a) PRIOR ART
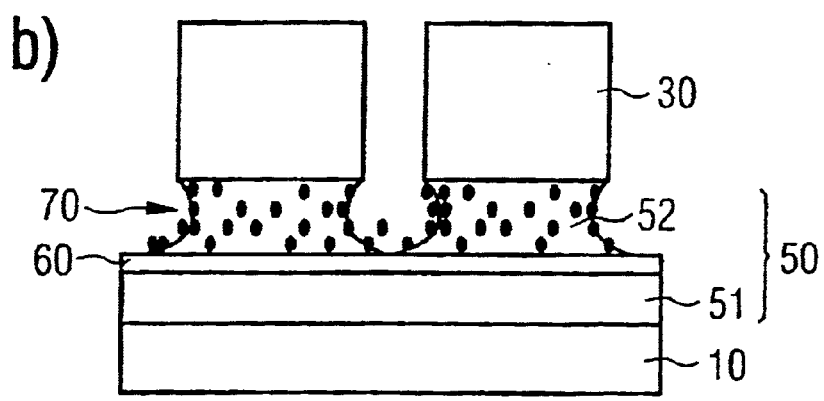
b) PRIOR ART
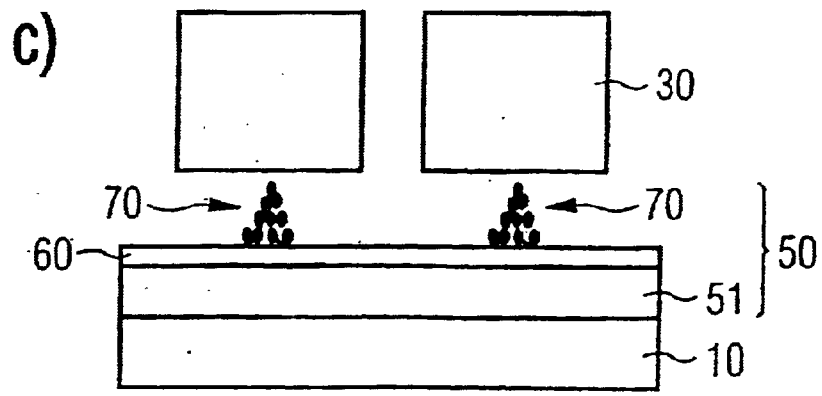
c) PRIOR ART

FIG 8
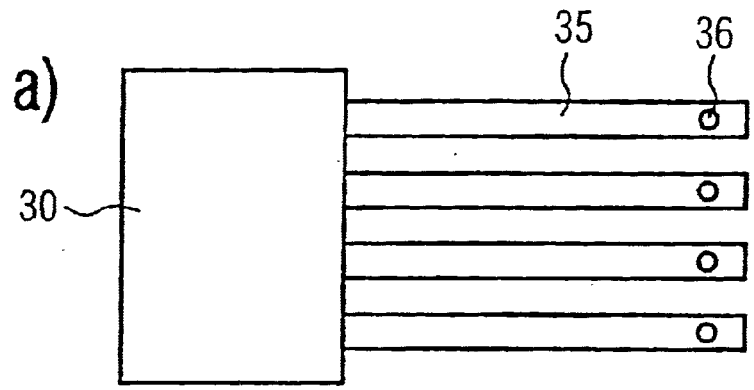
a) PRIOR ART
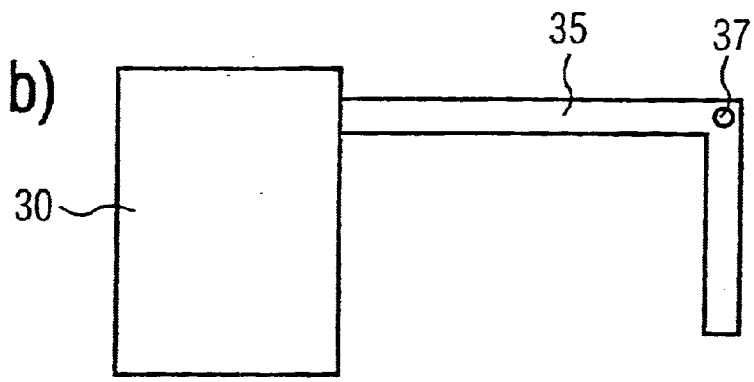
b) PRIOR ART
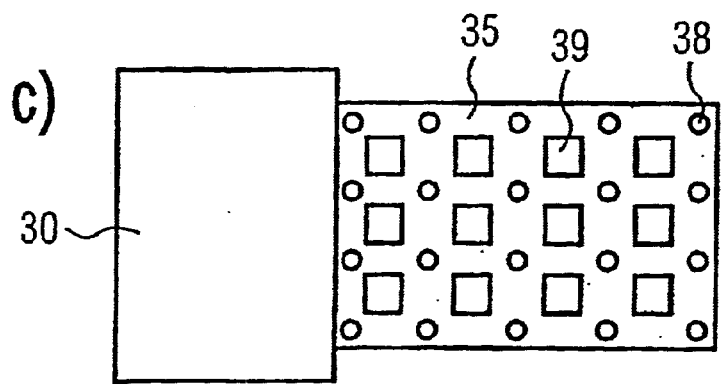
c) PRIOR ART

MICROMECHANICAL STRUCTURE, IN PARTICULAR FOR AN ACCELERATION SENSOR OR YAW RATE SENSOR AND A CORRESPONDING METHOD FOR PRODUCING THE SAME

FIELD OF THE INVENTION

The present invention relates to a micromechanical structure, e.g., for an acceleration sensor or rotational speed sensor, including a substrate, which includes an anchoring device and a centrifugal mass, which is connected to the anchoring device via a flexible spring device, so that the centrifugal mass is elastically deflectable from its rest position. The present invention also provides a manufacturing method for said micromechanical structure.

Although it is usable on any micromechanical structure, the present invention and the problem on which it is based will be described in relation to a micromechanical rocker structure for an acceleration sensor or rotational speed sensor.

BACKGROUND INFORMATION

FIG. 6 shows a schematic top view of a known micromechanical structure in the form of a rocker structure for an acceleration sensor or rotational speed sensor; FIG. 6a shows the micromechanical structure in top view and FIG. 6b in a sectional view along line C–C'.

Micromechanical acceleration sensors and rotational speed sensors are conventional. The operation and configuration of an acceleration sensor are based on elastic vertical sensitivity, i.e., a direction of detection, to acceleration which is perpendicular to the chip plane.

A conventional micromechanical structure includes a substrate, which includes an anchoring device and a centrifugal mass in the form of a rocker including longitudinal and transverse bars and corresponding clearances, which is connected to anchoring device via a flexible spring device, so that centrifugal mass is elastically deflectable from its rest position.

This deflectability is implementable by etching a sacrificial layer 50 under centrifugal mass 30. Sacrificial layer 50 is composed of a lower sacrificial sublayer 51 and an upper sacrificial sublayer 52, between which electrode areas 60 are provided, which cooperate electrostatically with centrifugal mass 30.

In this structure, sacrificial layer 50 is present in a first area situated under centrifugal mass 30 with a first etchable thickness d1, and in a second area situated under centrifugal mass 30 with a second etchable thickness d1+d2+d3, second thickness d1+d2+d3 is greater than first thickness d1.

Thus, in this component, the movable components are situated in an upper electromechanically functional plane and are made of epitactical polysilicon. Under this plane, at a distance corresponding to sacrificial sublayer thickness d1, is a second electrically functional plane made of doped silicon, which acts as a capacitive counterelectrode to the upper functional layer.

This basic layer structure of such a vertically sensitive acceleration sensor is shown along line C–C' in FIG. 6b. Sacrificial layer 50 has been selectively removed according to FIG. 6b. Sacrificial sublayer 52 has been left in place in the area of the anchoring device in order to connect the latter to underlying layers 60, 51, and thus to substrate 10.

In order to manufacture this structure, sacrificial sublayer 51 including a layer thickness d3 is deposited on underlying substrate 10 using a CVD method. The electrode layer made of doped silicon and including layer thickness d2 is deposited on sacrificial sublayer 51 and structured to form electrode areas 60. Subsequently sacrificial sublayer 52 including layer thickness d1 is deposited on underlying electrode areas 60, i.e., sacrificial sublayer 51 using the CVD method. Finally, centrifugal mass 30 is formed from an epitactical polysilicon layer, and sacrificial layer 50 is etched to provide deflectability.

When etching sacrificial layer 50, i.e., sacrificial sublayers 51, 52, electrode areas 60 are not attacked, so that they act as etching depth stops. In contrast, etching between electrode areas 60 proceeds to substrate 10.

The layer thickness of CVD sacrificial sublayers 51, 52 is usually between 2.0 µm and 1.0 µm. They are usually made of TEOS (tetraethoxysilane) oxide, or of silane oxide.

TEOS is obtained via the following chemical reaction:

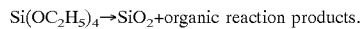

$Si(OC_2H_5)_4 \rightarrow SiO_2$ + organic reaction products.

Silane oxide is obtained via the following reaction:

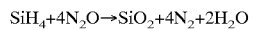

$SiH_4 + 4N_2O \rightarrow SiO_2 + 4N_2 + 2H_2O$

FIGS. 7a–7c show enlarged details of the micromechanical structure according to FIG. 6 underneath the movable bars during different phases of the sacrificial layer etching process.

The CVD deposition technique of sacrificial sublayers 51, 52 causes contaminants 70 from the reaction products, such as for example organic components, to be incorporated in TEOS (schematically represented in FIG. 7 for sacrificial sublayer 52) or nitrogen inclusions to be incorporated in silane oxide.

This undesirable incorporation only slightly impairs the electrical insulating properties of sacrificial sublayers 51, 52, so that the microelectromechanical applications are unaffected.

However, contaminants 70 may cause a problem when they are not attacked during selective etching of sacrificial layer 50 or when they react with the etching medium forming non-soluble and/or non-volatile compounds as residues. During sacrificial layer etching, these residues become enriched from the already etched portions of the oxide on the $SiO_2$ etching front (see FIG. 7b). They may cross-link, agglomerate to form larger structures, and remain on electrode areas 60 underneath movable centrifugal mass 30 as solid, non-conductive particles having a size of up to layer thickness d1 of sacrificial sublayer 51 (FIG. 7c). This creates the danger of these particles blocking the deflection of centrifugal mass 30 in the z direction or of producing an electrical short circuit therewith.

Intensive research has yielded the surprising finding that, due' to the enrichment mechanism on the etching front (FIGS. 7a–7c), larger residue particles are formed in critical areas where during sacrificial layer etching multiple etching fronts come together shortly before the process end. In this case, only small particles having a small height, which are not critical for the functionality of z-sensitive centrifugal masses 30, are formed when two etching fronts come together.

However, if three or more etching fronts come together, high particle structures may form, which greatly reduce the mechanical functional area.

FIGS. 8a–8c schematically show critical areas of the micromechanical structure according to FIGS. 6 and 7.

Critical points in the micromechanical structure, i.e., the sensor configuration, where more than two etching fronts come together, are located a) under end 36 of underetched, free-standing bar structures 35 (FIG. 8a), b) under flexion points 37 of underetched, free-standing bar structures 35 (FIG. 8b), c) under points of intersection 38 of underetched, free-standing bar structures 35, as formed, for example, due to holes or clearances 39 for better underetching (FIG. 8c).

For vertically sensitive acceleration sensors and rotational speed sensors, the above-named structure elements a) to c) are used to configure the mechanically functional plane. In the case of large-surface, horizontally arranged capacitance electrodes in the functional layer, the holes are arranged close together on the surface in order to achieve sufficient underetching. Previously, attention was only paid to optimum underetching or free etching of the mechanical structure, but not to possible etching residues.

The formation of etching residues at the above-mentioned points in the sensor configuration represents a problem in z-sensitive components in which sacrificial layer 50 is removed in a dry, isotropic etching step. Here they may not be detached or rinsed away by a liquid phase of the etching medium. They are critical for the functionality if they are located underneath the electromechanically functional structures such as, for example, the rocker structure of a z acceleration sensor, and their size approximately corresponds to the distance between the electrically functional layer and the electromechanically functionally layer above it.

It is an object of the present invention to eliminate etching residues that may impair the function of micromechanical components and structures.

SUMMARY OF THE INVENTION

The present invention provides that the centrifugal mass has a certain structure with clearances, which may be made deflectable by etching a sacrificial layer underneath it. The sacrificial layer is present in a first area located underneath the centrifugal mass with a first etchable thickness and in a second area located underneath the centrifugal mass with a second etchable thickness, the second thickness is greater than the first thickness. The centrifugal mass is structured in the first area so that in etching only a maximum of two etching fronts may come together in order to limit etching residue deposits.

The present invention may provide the advantage that it provides an effective configuration for micromechanical components or structures to avoid mechanically or electrically interfering influences of etching residues.

Using the present invention, the formation of etching residues which are critical in terms of their size under electromechanically functional micromechanical structures is virtually eliminated. Thus it is achieved that the process yield of freely vibrating sensor structure is increased and a possible safety risk due to the failure of blocked z-sensitive sensors, for example, if used in motor vehicles, is reduced.

Example embodiments of the present invention are illustrated in the drawings and described in greater detail in the description that follows.

BRIEF DESCRIPTION OF THE DRAWINGS

FIG. 2a shows a schematic top view of a first bar geometry of a second example embodiment of the micromechanical structure according to the present invention in the form of a rocker structure.

FIG. 2b shows a top view of a second bar geometry of a second example embodiment of the micromechanical structure according to the present invention in the form of a rocker structure.

FIG. 4a shows a schematic top view of a fourth example embodiment of the micromechanical structure according to the present invention in the form of a rocker structure.

FIG. 4b shows a section along line B–B' of a fourth example embodiment of the micromechanical structure according to the present invention in the form of a rocker structure.

FIG. 6a shows a schematic top view of a conventional micromechanical structure in the form of a rocker structure for an acceleration sensor or rotational speed sensor.

FIG. 6b shows a section along line C–C' of a conventional micromechanical structure in the form of a rocker structure for an acceleration sensor or rotational speed sensor.

FIG. 7a shows enlarged details of the micromechanical structure according to FIGS. 6a–6b underneath the movable bars, during different phases of the sacrificial layer etching process.

FIG. 7b shows enlarged details of the micromechanical structure according to FIGS. 6a–6b underneath the movable bars, during different phases of the sacrificial layer etching process.

FIG. 7c shows enlarged details of the micromechanical structure according to FIGS. 6a–6b underneath the movable bars, during different phases of the sacrificial layer etching process.

FIG. 8a shows a schematic view of critical areas of the micromechanical structure according to FIGS. 6a, 6b, 7a, 7b, and 7c.

FIG. 8b shows a schematic view of critical areas of the micromechanical structure according to FIGS. 6a, 6b, 7a, 7b, and 7c.

FIG. 8c shows a schematic view of critical areas of the micromechanical structure according to FIGS. 6a, 6b, 7a, 7b, and 7c.

DETAILED DESCRIPTION

In the figures, the same reference symbols denote the same components or components having the same function.

Figure 1:
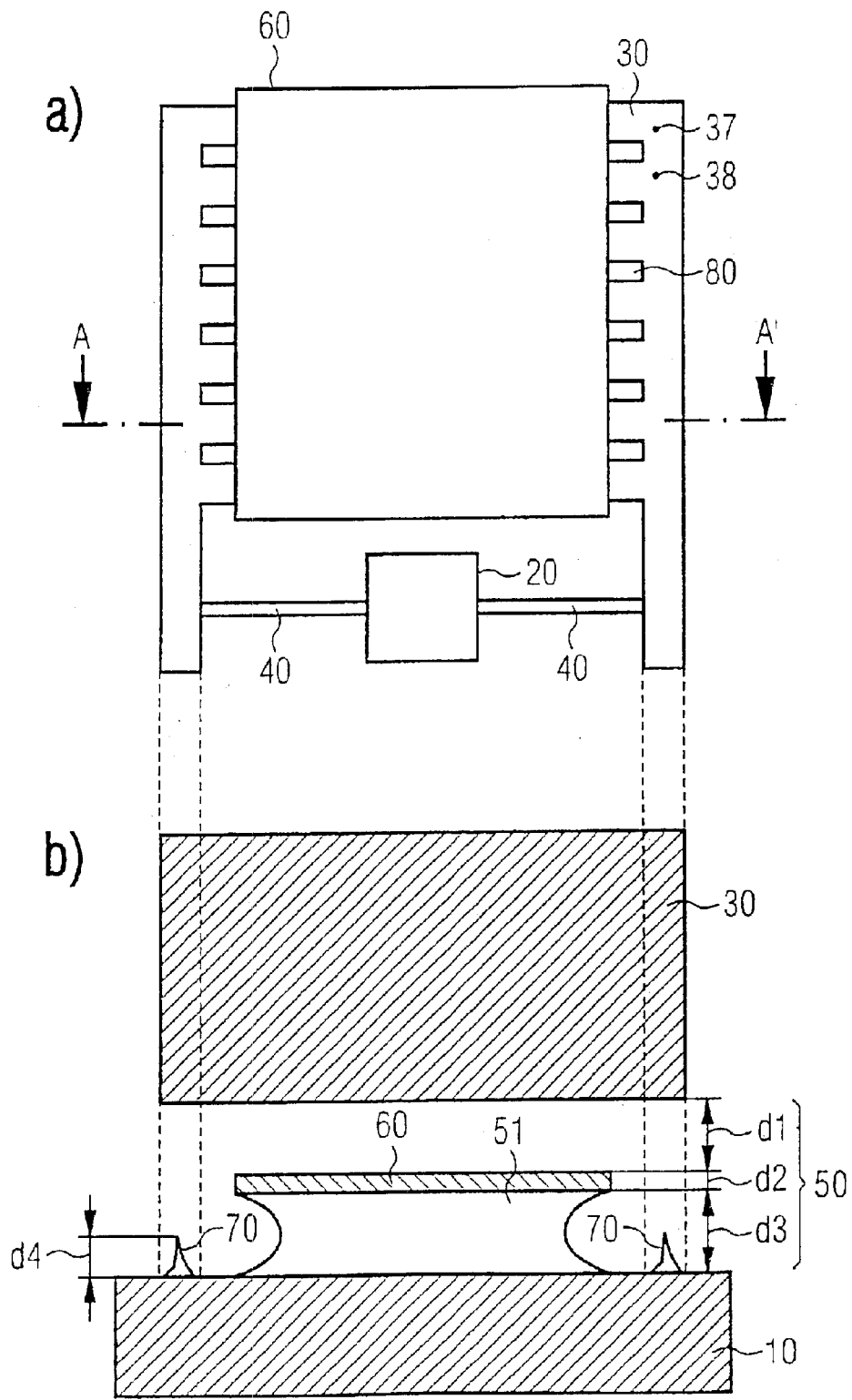
FIG. 1a shows a schematic top view of a first example embodiment of the micromechanical structure according to the present invention in the form of a rocker structure.
FIG. 1b shows a section along line A–A' of a first example embodiment of the micromechanical structure according to the present invention in the form of a rocker structure.

FIG. 1 shows a schematic top view of a first example embodiment of the micromechanical structure according to the present invention in the form of a rocker structure; specifically, FIG. 1a shows a top view, and FIG. 1b shows a section along line A–A'.

The structure according to FIG. 1 includes a substrate 10, which includes an anchoring device 20 and a centrifugal mass 30 in the form of a rocker including longitudinal and transverse bars and corresponding clearances 80, which is connected to anchoring device 20 via a flexible spring device 40, so that centrifugal mass 30 is elastically deflectable from its rest position.

As in the case of the structure according to FIG. 6, deflectability is implementable in this example embodiment by etching sacrificial layer 50 situated under centrifugal mass 30. Sacrificial layer 50 includes a lower sacrificial sublayer 51 and an upper sacrificial sublayer 52, between which electrode areas 60 are provided, which electrostatically cooperate with centrifugal mass 30.

In this configuration, sacrificial layer 50 is located in a first area underneath centrifugal mass 30 and includes a first etchable thickness d1, namely electrode area 60.

In a second area, sacrificial layer 50 has a second etchable thickness d1+d2+d3, second thickness d1+d2+d3 is greater than first thickness d1.

The essence of this first example embodiment is a modification of conventional rocker configuration and conventional electrode configuration with the objective of avoiding ending, bending, or intersecting bar structures in the electromechanical functional layer above electrode area 60 in the electrically functional plane.

This is achieved in this first example embodiment by the fact that in the functional layer the longitudinal bar and the transverse bar are drawn over the edge of electrode area 60 underneath, so that the required corners 37 and intersections 38 of the longitudinal and transverse bars are located at points where sacrificial layer 50 which here too includes two layers, one lower sacrificial sublayer 51 and one upper sacrificial sublayer 52 (both made of CVD oxide), is considerably larger than height d4 of etching residues 70, which is limited to a maximum equal to the thickness of lower CVD sacrificial sublayer 51. In other words, this configuration measure is effective when thickness d1 of CVD sacrificial sublayer 52 in FIG. 1b is smaller than or equal to the sum of the thicknesses of layer 51 and layer 60, since layer 51 determines the maximum height d4 of the etching residues.

Thus, although etching residues 70 are still obtained, they are sunk in this manner under the plane of electrode area 60 and therefore are incapable of blocking the rocker structure.

This configuration measure may provide the advantage that process fluctuations, which may result in a fluctuating local distribution of etching residues over time during manufacturing, are incapable of affecting the functionality of the components or the process yield, since the negative effects of the particles generated are counteracted due to their non-critical position.

FIG. 2 shows a schematic top view of a second example embodiment of the micromechanical structure according to the present invention in the form of a rocker structure; specifically, FIG. 2a shows a top view of a first bar geometry, and FIG. 2b shows a top view of a second bar geometry.

In the second example embodiment according to FIG. 2a, a first electrode area 60a, a second electrode area 60b, and a conductive shielding electrode area 90 as electrically functional layers are located in the printed conductor plane under the electromechanically effective structures. The electromechanically functional components include longitudinal bars and transverse bars which connect them and which do not end or bend or intersect over the electrode areas of the printed conductor plane, i.e., 60a, 60b, 90. Corner points 37 and points of intersection 38 are located next to lower electrode areas 60a, 60b, 90.

The transverse bars are divided into groups running over a lower electrode area 60a, 60b, 90. Within a group, there are clearances 80a, which are smaller than those between adjacent groups, where the clearances identified as 80b are wider, so that no transverse bar runs through the clearance area between two lower electrode areas 60b –90.

In FIG. 2b, the bars within the upper functional layer are arranged rotated by a 90° angle compared to the arrangement of FIG. 2a. Clearances 80c running in the longitudinal direction and clearances 80d running in the transverse direction are provided here.

Figure 3:
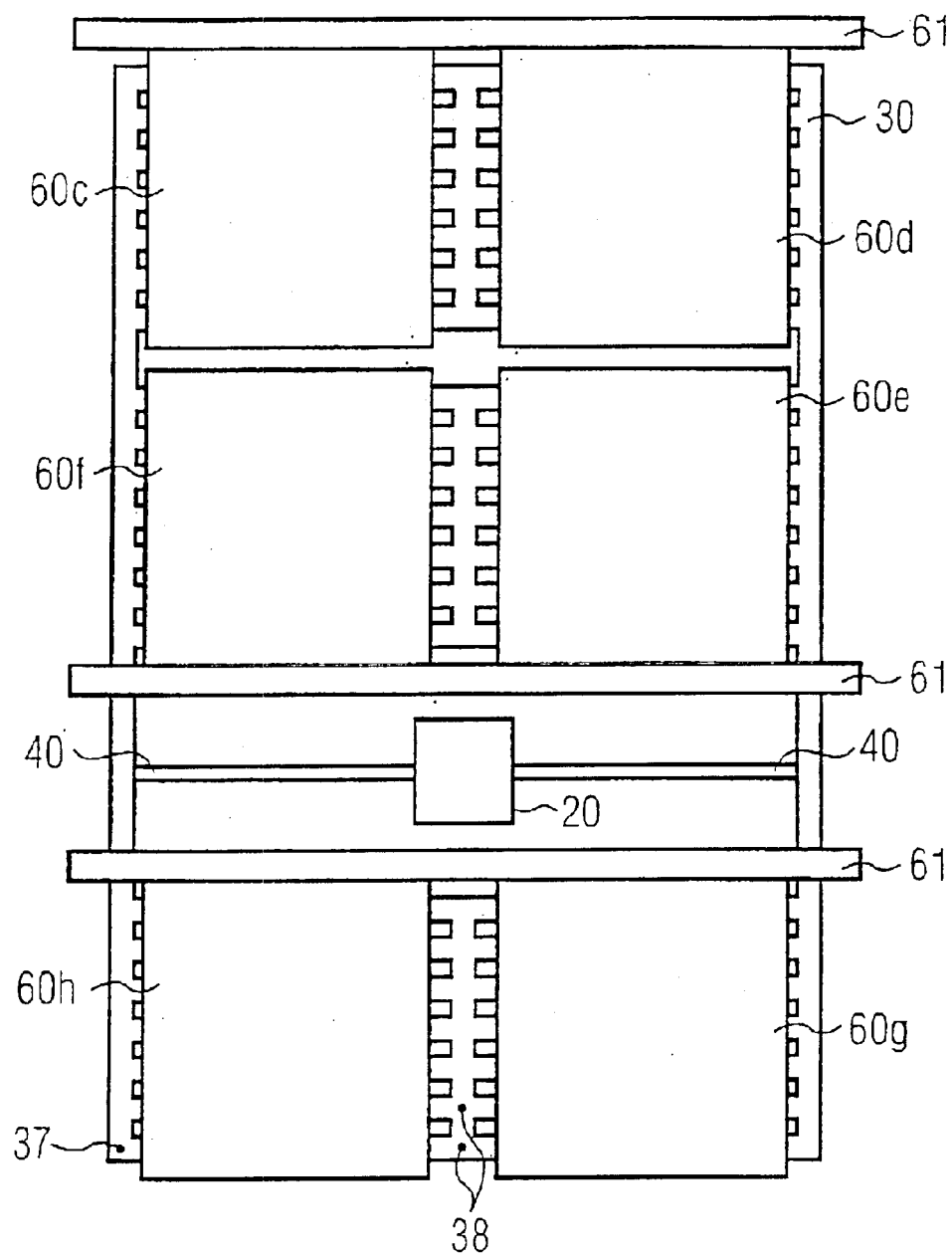
FIG. 3 shows a schematic top view of a third example embodiment of the micromechanical structure according to the present invention in the form of a rocker structure.

FIG. 3 shows a schematic top view of a third example embodiment of the micromechanical structure according to the present invention in the form of a rocker structure.

In this additional example embodiment, lower electrode surfaces 1, 2, 3 underneath the electromechanical structures may be divided, so that points of intersection 38 of the transverse bars of the upper functional layer are located above the clearances left open between lower electrode areas 60c–60h. In addition, electrode areas 60c, 60d, as well as 60e, 60f, and 60g are connected to one another in pairs via a printed conductor 61.

FIG. 4 shows a schematic top view of a fourth example embodiment of the micromechanical structure according to the present invention in the form of a rocker structure; specifically, FIG. 4a shows a top view and FIG. 4b shows a section along line B–B'.

FIGS. 4a (top view) and 4b (cross section) show how an example embodiment of the present invention is configurable with circular openings 85 in lower electrode area 60i. Holes 85 are situated at the specific locations where etching residues from points of intersection 38 may get under centrifugal mass 30, which is also provided with openings 86. Residues 70 may sink into recesses of sacrificial sublayer 51 and thus be made harmless.

Figure 5:
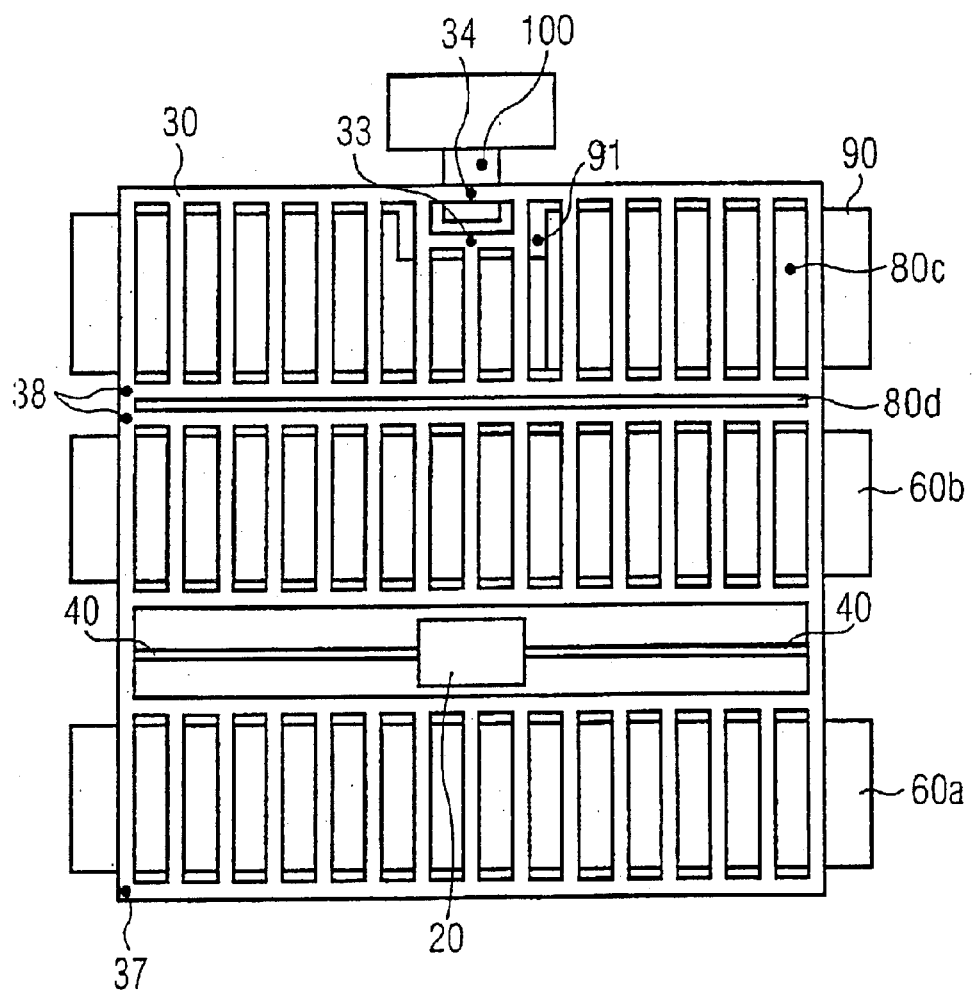
FIG. 5 shows a schematic top view of a fifth example embodiment of the micromechanical structure according to the present invention in the form of a rocker structure including a stop.

FIG. 5 shows a schematic top view of a fifth example embodiment of the micromechanical structure according to the present invention in the form of a rocker structure including a stop.

In this example embodiment of the present invention, it is shown, with reference to the structure according to FIG. 2b, how a mechanical deflection limit 100 in the z direction (vertical stop underneath centrifugal mass 30) is implementable.

A recess 91, over which internal bar structures 33 end, is made in electrode area 90. In the printed conductor plane, the stop surface of mechanical deflection limit 100, fixedly connected to the substrate, protrudes into recess 91 under a transverse bar 34, which runs without bending, ending, or intersecting in the electromechanically functional structure of centrifugal mass 30. The stop structure becomes effective in the event of high accelerations in the z direction in that transverse bar 34 strikes the stop surface.

FIG. 6 shows a schematic top view of a conventional micromechanical structure in the form of a rocker structure for an acceleration sensor or rotational speed sensor; FIG. 6a shows the micromechanical structure in top view and FIG. 6b in a sectional view along line C–C'.

FIGS. 7a–7c show enlarged details of the micromechanical structure according to FIG. 6 underneath the movable bars, during different phases of the sacrificial layer etching process.

FIGS. 8a–8c show schematic views of critical areas of the micromechanical structure according to FIGS. 6 and 7.

Although the present invention was described above with reference to example embodiments, it is not limited thereto, but is modifiable in a variety of manners.

The configuration measure according to the present invention is applicable if TEOS or silane oxide is used as the sacrificial (sub)layer and sacrificial layer etching occurs in an HF-containing gaseous phase. In this case etching residues which have critical diameters for CVD oxide thicknesses between 0.5 $\mu$m and 2 $\mu$m are usually obtained.

Using the above-described configuration rules that, when using CVD oxide as the sacrificial layer in z-sensitive structures over the printed conductor plane, a) no bar ends, b) no bar bends, and c) no bar intersections may occur in the upper functional layer, a variety of versions of the example embodiments described above may be developed.

The geometry of the structure is not limited to the rocker geometries or electrode geometries illustrated.

The above-described manufacturing method is also to be understood as an example only, and other methods such as, for example, galvanic methods, may also be used for manufacturing the structure.

What is claimed is:

1. A micromechanical structure for one of an acceleration sensor and a rotational speed sensor, comprising:

an anchoring device;

a substrate that includes the anchoring device;

a flexible spring device;

a sacrificial layer; and a centrifugal mass that is connected to the anchoring device via the flexible spring device so that the centrifugal mass is elastically deflectable from a rest position, the centrifugal mass including a clearance and being configured to be deflectable by etching the sacrificial layer underneath the centrifugal mass;

wherein the sacrificial layer is arranged in a first area arranged under the centrifugal mass with a first etchable thickness and in a second area arranged under the centrifugal mass with a second etchable thickness, the second thickness is greater than the first thickness, and the centrifugal mass is structurally formed in the first area such that during etching of the sacrificial layer only a maximum of a first etching front and a second etching front come together in order to limit an etching residue deposit.

2. The micromechanical structure according to claim 1, wherein:

the sacrificial layer includes a first sacrificial sublayer and a second sacrificial sublayer arranged above the first sacrificial sublayer; and a non-etchable electrode area is arranged between the first sacrificial sublayer and the second sacrificial sublayer when etching the sacrificial layer, the non-etchable electrode area forming the first area.

3. The micromechanical structure according to claim 1, wherein:

the centrifugal mass includes an ending bar structure, a bending bar structure, and an intersecting bar structure; and the first area does not include the ending bar structure, the bending bar structure, and the intersecting bar structure.

4. The micromechanical structure according to claim 2, wherein:

the centrifugal mass includes a rocker structure that includes a first external longitudinal bar, a second external longitudinal bar, and a plurality of transverse bars between the first external longitudinal bar and the second external longitudinal bar; and the first external longitudinal bar, the second external longitudinal bar, and the plurality of transverse bars are drawn over an edge of the non-etchable electrode area, the non-etchable electrode area is contiguous to and under the first external longitudinal bar, the second external longitudinal bar, and the plurality of transverse bars.

5. The micromechanical structure according to claim 1, wherein:

the first area includes a plurality of non-contiguous electrode areas.

6. The micromechanical structure according to claim 1, further comprising:

a mechanical stop limit arranged in the first area.

* * * * *